April 27, 1943.  J. A. J. BENNETT  2,317,341
HELICOPTER AND METHODS OF OPERATING SAME
Filed Aug. 23, 1940
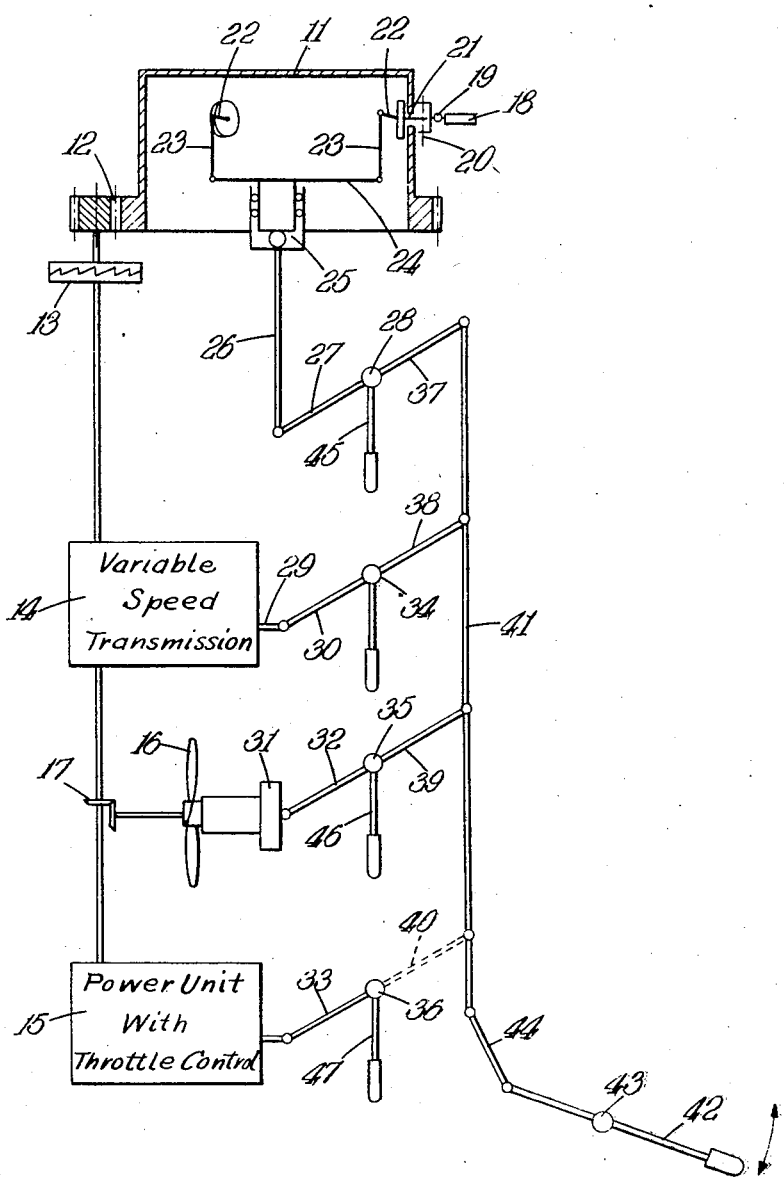

Patented Apr. 27, 1943

2,317,341

UNITED STATES PATENT OFFICE 2,317,341

HELICOPTER AND METHOD OF OPERATING SAME

James Allan Jamieson Bennett, Esher, England, assignor to Autogiro Company of America, Willow Grove, Pa., a corporation of Delaware Application August 23, 1940, Serial No. 353,809
In Great Britain January 24, 1939

26 Claims. (Cl. 244—17)

The present invention relates to helicopters and its main object is to improve the take-off characteristics.

It is known in rotaplanes (as disclosed, for example, in British Patent No. 420,322, corresponding to copending U. S. application of Juan de la Cierva, Serial No. 738,349, filed August 3, 1934) to obtain what has been termed a "jump take-off" by utilising excess kinetic energy, stored in a sustaining rotor by driving it with the blades set at a pitch angle giving substantially minimum rotational drag and thereby imparting a higher rate of rotation than obtains in autorotative flight, to produce initial lift in excess of the weight of the machine, by rapidly increasing the pitch setting of the blades concurrently with disconnection of the transmission from the engine to the rotor.

The present invention makes use of a similar method as applied to helicopters of known types, one example of which is disclosed in Avery Patent No. 1,993,701. In a helicopter, according to the present invention, the lift of a lifting rotor at take-off is increased by imparting to it revolutions in excess of the normal revolutions obtained in power driven flight conditions, the blades being set for this purpose to a pitch angle giving decreased rotational drag, preferably minimum rotational drag, and the pitch angle of the blades being rapidly increased at least to the normal value for take-off and preferably to a somewhat higher value when a suitable excess of revolutions of the rotor has been obtained, without entirely disconnecting the transmission between the engine and the rotor.

As in a helicopter the gear ratio between the engine and the rotor (or rotors) driven thereby is normally selected so that the engine is running at or about its normal rated revolutions when driving the rotor with the blades set at the appropriate pitch angle for normal (unassisted) take-off, it will be seen that with a fixed gear ratio between the engine and the rotor, excess revolutions can only be imparted to the latter at the cost of seriously overrevving the engine.

According to the present invention therefore the transmission between the engine and the rotor or rotors of a helicopter having variable pitch blades includes means for varying the gear ratio between the engine and rotor(s) which means is interconnected or cooperates with the means for varying the pitch angle of the rotor blades, in such a way that a change from a high gear ratio of the transmission to the normal or low gear ratio automatically accompanies or is accompanied by a change of setting of the rotor blades from low pitch to high pitch setting.

This may be accomplished by suitable interconnection between the selector means of an overdrive device or change speed gear and the rotor blade pitch varying means. The operation is preferably reversible so that when the overdrive or high gear ratio is selected the rotor blades are set in the low pitch position.

In order to prevent forced overrevving of the engine by the fly wheel action of the rotor (or rotors) when the gear ratio is changed from high (or overdrive) to low (or normal) a free wheel transmission element is preferably provided between the overdrive device or change speed gear of the rotor transmission causing the rotor to overrun the engine when the gear ratio is changed from high to low. This will not in itself prevent overrevving of the engine because as soon as the rotor overruns the engine the load imposed on the latter by driving the rotor is removed. Consequently, either the throttle setting must be decreased on changing from high to low gear, which may be effected automatically by means of an interconnection between the gear selecting means and the throttle, or means must be provided for throwing an additional load on the engine when the gear ratio of the transmission is changed from high to low. This may be accomplished by providing a propulsive airscrew of the controllable pitch type driven by the same engine as drives the rotor and having its pitch selecting control means interconnected with the gear selecting means of the rotor drive so that the airscrew is set in low pitch, when the high gear of the rotor transmission is engaged, and is set in high (or normal) pitch when the rotor transmission reverts to normal or low gear ratio. This arrangement offers the further advantage that the proportion of the available power delivered to the rotor is a maximum when the rotor transmission is in high gear thus affording the greatest possible excess of revolutions of the rotor while being driven prior to take-off.

In any case in which a controllable pitch propulsive airscrew is fitted it is desirable to provide an overriding manual or other control for regulating the pitch of the airscrew independently of the pitch of the rotor blades and of the gear ratio between the engine and the rotor.

The invention will now be described with reference to the accompanying diagrammatic drawing.

As shown a rotor head 11 is connected via spur gearing 12, a free wheel device 13 and a two speed variable gear box 14, to a power unit 15. A variable pitch airscrew 16 is also connected, by gearing 17, to be driven by the power unit 15. The airscrew offset (with respect to the rotor axis) may be as shown in the Avery patent above-mentioned, or may be disposed in accordance with other known arrangements for counteracting torque in helicopters.

The rotor head 11 carries three blades of which one is indicated in part at 18, and each of these is connected with said head 11 by a flapping pivot 19, a lead-lag pivot 20 and a pivot 21 whose axis coincides or lies parallel with the axis of the blade when in the radial position. Movement about this last pivot 21 effects change in the pitch angle of the blade, and to effect such movement the inner part of the bearing member 21 has an integral radius arm 22, the inner end of which latter in turn is connected by a depending link 23, with a spider or plate 24 mounted as indicated at 25 to be moved up and down within the head 11 to effect increase and decrease, respectively, of the pitch angles of the blades 18. For imparting such movement to the mounting 25 of the spider 24 a stem or thrust rod 26 extends downwardly therefrom and is connected at its lower end with one end of a control lever 27 fulcrumed at 28.

As illustrated, clockwise movement of the lever 27 will increase the pitch of the rotor blades and anti-clockwise movement decrease said pitch.

The selector indicated at 29 of the two-speed variable gear box 14 is connected to be operated by a lever 30. The selector is shown in the high gear position which is normal for high-speed rotor drive on the ground in preparation for take-off; and movement of the lever 30 in a clockwise direction shifts the selector 29 to the low gear position which is employed for driving the rotor in normal flight.

The airscrew 16 has mechanism indicated at 31 for varying the pitch thereof which is connected with an operating lever 32. As shown, this operating lever 32 is in the low pitch position in which it is set prior to take-off, and rotation of this lever 32 in a clockwise direction will increase the pitch of the propeller 16 to the normal setting for flight.

A throttle control lever for the power unit 15 is indicated at 33, this being shown at a setting in which it affords increased throttle opening for driving the rotor head 11 prior to take-off, and from which it may be shifted in a clockwise direction to its normal setting for flight.

Each of the levers 27, 30, 32 and 33 is extended beyond its fulcrum 28, 34, 35 and 36, respectively, as indicated at 37, 38, 39 and in broken lines at 40, respectively, where it is connected operatively with a control rod 41 common to all said levers and which may be lowered from or raised to the position shown to rock said levers in a clockwise or anti-clockwise direction by means of a main control lever 42, fulcrumed at 43 and connected with the control rod 41 by a link 44.

In the position shown in the drawing the various controls are set for what has before been referred to as a "jump take-off." The blades 18 of the rotor are set to a pitch angle giving decreased rotational drag, preferably minimum rotational drag. The high gear ratio of the gear box 14 is operative, the pitch of the airscrew 16 is low and the throttle control 33 (where this is connected with the control rod 41) is set to give a large throttle opening. These settings remain until the rotor has had imparted to it revolutions in excess of the normal revolutions obtaining under power driven flight conditions. After such excess revolutions are obtained, take-off is effected by shifting the main control lever 42 in an anti-clockwise direction, whereby the control rod 41 is shifted downwardly and the levers 27, 30, 32 and 33 (where this last is connected with the control rod 41) are so moved that the pitch angle of the rotor blades 18 is rapidly increased to the normal value and preferably to a somewhat higher value than is normal for flight, the low gear ratio of the gear box 14 is made operative, the pitch of the airscrew 16 is increased and the throttle opening (where this is simultaneously controlled) is reduced to the setting which is normal for flight. It will be clear that whereas by the low setting of the airscrew pitch prior to take-off the transmission of maximum power to the rotor to give maximum excess revolutions thereof is ensured, overdriving of the power unit by the rotor when the low gear ratio is selected is prevented by the free-wheel device 13 and also overrevving of the power unit 15 under these conditions is prevented effectively by the additional load thrown thereon by the airscrew 16 as a result of the increased pitch thereof.

In general, either the pitch changing means 31 of the airscrew 16 or the throttle control 33 will be connected for simultaneous operation with the selector of the gear box and with the rotor blade pitch angle changing means (though, if desired, in some cases both the throttle and the gear selector may be so connected).

Further, it will in general be advisable to provide (in addition to the means already described for adjusting the rotor blade pitch angle, the gear box 14 and the pitch of the airscrew 16, with or without the throttle) overriding controls whereby the pilot may adjust at will the pitch angle of the rotor blades, the pitch of the airscrew and the setting of the throttle, independently. Such independent control means are indicated at 45 in respect of the rotor blade pitch angle, at 46 in respect of the airscrew pitch, and at 47 in respect of the throttle. It will be apparent that the control or adjusting means may be of various types within the scope of the invention. For example, although mechanical means have been indicated in the drawing it may be preferable to employ hydraulic means or a combination of mechanical and hydraulic means. In the actual arrangement of the drawing it may be assumed that the lever arms 27 and 45 comprise an integral bell crank lever with which the lever arm 37 is connected frictionally at the fulcrum 28; the lever arms 32 and 46 being similarly comprised by an integral bell crank lever with which the lever arm 39 is coupled frictionally at the fulcrum 35, the main operating lever 42 being frictionally mounted at its fulcrum 43. As a result of such frictional couplings and frictional mounting the operation of the lever 42 will have the effect described above, but the operation by the pilot of the overriding control levers 45, 46 will adjust the pitch of the rotor blades or of the airscrew but not both, for the friction at 28 will be insufficient to overcome the friction at 35 and at 43 and, similarly, the friction at 35 will be insufficient to overcome the friction at 28 and 43. Thus the change in pitch of the rotor blades and of the airscrew by the lever 42 will be based, so to speak, upon the settings of the rotor blade pitch angle and of the airscrew pitch by the overriding controls 45 and 46. In practice it may be desirable to provide means ensuring that these overriding controls 45 and 46 are set to pre-determined positions prior to the driving of the rotor at high speed for take-off. What has just been said about the controls 27 and 32 applies equally to the throttle control 33.

What I claim is:

1. The method of operating an aircraft having a variable pitch sustaining rotor and a variable speed power transmission for driving the rotor, which method includes driving the rotor with the machine on the ground in preparation for take-off, this driving being effected with the mean rotor blade pitch at a non-lifting angle and with the power transmission adjusted to a high transmission ratio, and effecting take-off of the aircraft by raising the mean rotor blade pitch angle while continuing the drive of the rotor but at a decreased transmission ratio.

2. The method of operating an aircraft incorporating a variable pitch sustaining rotor, a variable pitch airscrew and variable power transmission means for driving the rotor, which method includes driving the rotor and the airscrew with the machine on the ground in preparation for take-off, this driving being effected with the mean rotor blade pitch at a non-lifting angle, with the mean airscrew pitch at a relatively low angle and with the power transmission adjusted to a high transmission ratio, and effecting take-off of the aircraft by raising the mean rotor blade pitch angle while continuing the drive of the rotor but at a decreased transmission ratio, and while continuing the drive of the airscrew but at an increased mean pitch angle.

3. The method of operating an aircraft incorporating a variable pitch sustaining rotor, a variable pitch propulsive airscrew and variable power transmission means for driving the rotor, which method includes driving the rotor and the airscrew with the machine on the ground in preparation for take-off, this driving being effected with the mean rotor blade pitch at a non-lifting angle, with the mean airscrew pitch at a relatively low angle and with the power transmission adjusted to a high transmission ratio, and effecting take-off of the aircraft by raising the mean rotor blade pitch angle while continuing the drive of the rotor but at a decreased transmission ratio, and while continuing the drive of the airscrew but at an increased mean pitch angle, and utilizing said airscrew to propel the craft as well as to counteract torque reaction of the rotor.

4. An aircraft including a variable pitch sustaining rotor, engine means for driving the rotor, drive mechanism connecting the engine means and the rotor including a variable speed transmission, means for raising and lowering the mean pitch of the rotor, means for selectively changing the power transmission ratio, and control means interrelating the operation of said two last means and providing for conjoint actuation thereof in senses providing for increase of rotor blade pitch and decrease of transmission ratio.

5. An aircraft in accordance with claim 4, and further incorporating a propulsive airscrew having means for varying the blade pitch thereof, and the control means further being interconnected with the means for varying the airscrew pitch in a sense providing for increase of airscrew pitch upon increase of rotor blade pitch and decrease of the power transmission ratio.

6. An aircraft in accordance with claim 4, and further incorporating separately operable manual control means for varying the mean rotor blade pitch.

7. An aircraft including a variable pitch sustaining rotor, an engine for driving the rotor, rotor drive mechanism interconnecting the engine and the rotor and incorporating a variable speed transmission, means for varying the mean rotor blade pitch angle, means for varying the transmission ratio, means for varying the speed of operation of the engine, and control mechanism interrelating the operation of said three means in a sense providing for conjoint increase of rotor blade pitch angle, decrease of transmission ratio and decrease of engine speed.

8. An aircraft in accordance with claim 7, and further incorporating a propulsive airscrew having means for varying the blade pitch thereof, the control mechanism further being coupled with said airscrew pitch varying means and providing for increase of airscrew pitch upon actuation of the control mechanism to increase rotor blade pitch.

9. An aircraft in accordance with claim 7, and further incorporating a propulsive airscrew having means for varying the blade pitch thereof, the control mechanism further being coupled with said airscrew pitch varying means and providing for increase of airscrew pitch upon actuation of the control mechanism to increase rotor blade pitch, together with separately operable manual control means for varying the airscrew pitch.

10. An aircraft in accordance with claim 7, and further incorporating a propulsive airscrew having means for varying the blade pitch thereof, the control mechanism further being coupled with said airscrew pitch varying means and providing for increase of airscrew pitch upon actuation of the control mechanism to increase rotor blade pitch, together with separately operable manual control means for varying the rotor blade pitch and separately operable manual control means for varying the airscrew pitch.

11. A construction according to claim 4 having also an airscrew positioned to rotate on a generally horizontal axis, and means for regulating the operation of the airscrew.

12. A construction according to claim 4 having also an airscrew positioned to rotate on a generally horizontal axis, and means acting under the influence of the control means to regulate the operation of said airscrew.

13. A construction according to claim 4 having also an air screw positioned to rotate on a generally horizontal axis, and means operative to change the pitch of said airscrew.

14. A construction according to claim 4 having also a variable pitch airscrew positioned to rotate on a generally horizontal axis and driven by the engine means which drive the rotor, and a manual control for varying the pitch of said airscrew.

15. An aircraft including a variable pitch sustaining rotor, engine means for driving the rotor, drive mechanism connecting the engine means and the rotor including a variable speed transmission, means for raising and lowering the mean pitch of the rotor, means for selectively changing the power transmission ratio, and control means interrelating the operation of said two last means and providing for conjoint actuation thereof in senses providing for increase of rotor blade pitch and decrease of transmission ratio, together with means for altering said interrelation.

16. An aircraft including a variable pitch sustaining rotor, engine means for driving the rotor, drive mechanism connecting the engine means and the rotor including a variable speed transmission, means for raising and lowering the mean pitch of the rotor, means for selectively changing the power transmission ratio, control means interrelating the operation of said two last means and providing for conjoint actuation thereof in senses providing for increase of rotor blade pitch and decrease of transmission ratio, and means providing for rotor pitch adjustment at will, irrespective of the transmission ratio.

17. In an aircraft having power means, a power-driven sustaining rotor comprising an axis member and variable-pitch blades pivoted thereon, a power-driven variable-pitch airscrew mounted to rotate on a generally horizontal axis which is offset from the rotor axis, means positively coordinating the variable pitch settings of said airscrew and rotor blades, whereby the pitch variation of both takes place in the same sense, means operative to alter the relative setting of airscrew pitch and rotor blade pitch for a given position of said coordinating means, and a device adapted to control said power means under the influence of said coordinating means.

18. In an aircraft having power means, a power-driven sustaining rotor comprising an axis member and variable-pitch blades pivoted thereon, a power-driven variable-pitch airscrew mounted to rotate on a generally horizontal axis which is offset from the rotor axis, so as to set up a counter torque, pitch-regulating means for positively coordinating the variable pitch settings of said airscrew and rotor blades comprising a movable member and operating connections whereby pitch variations of both the airscrew and the rotor blades can be caused to take place in the same sense by one and the same movement of said member, and a throttle control for said power means adapted for variable setting by movement of said member.

19. In an aircraft having power means, a power-driven sustaining rotor comprising an axis member and variable-pitch blades pivoted thereon, a power-driven variable-pitch airscrew mounted to rotate on a generally horizontal axis which is offset from the rotor axis, so as to set up a counter torque, pitch-regulating means for positively coordinating the variable pitch settings of said airscrew and rotor blades comprising a movable member and operating connections whereby pitch variations of both the airscrew and the rotor blades can be caused to take place in the same sense by one and the same movement of said member, a throttle control for said power means adapted for variable setting by movement of said member, and means providing for independent adjustments of at least one of the variable settings.

20. In a helicopter, a sustaining rotor, means for changing the pitch angle of the blades of said rotor, means for driving the rotor including a power unit and variable gear mechanism affording low and high gear ratios, and means interconnecting said pitch changing means and said gear mechanism whereby adjustment of the gear mechanism to afford the low gear ratio, on the one hand, and adjustment of the rotor blades to increased pitch angles, on the other hand, automatically take place together.

21. In a helicopter, a sustaining rotor, means for changing the pitch angle of the blades of said rotor, means for driving the rotor including a power unit and variable gear mechanism affording low and high gear ratios, said means for driving the rotor also including a free-wheel device whereby the rotor may overrun the power unit upon adjustment of the gear mechanism to afford the low gear ratio, and means interconnecting said pitch changing means and said gear mechanism whereby adjustment of the gear mechanism to afford the low gear ratio is automatically accompanied by adjustment of the rotor blades to increased pitch angles.

22. In a helicopter, a sustaining rotor, means for changing the pitch angle of the blades of said rotor, means for driving the rotor including a power unit having a throttle with control means for the latter and variable gear mechanism affording low and high gear ratios, said means for driving the rotor also including a free-wheel device whereby the rotor may overrun the power unit upon adjustment of the gear mechanism to afford a low gear ratio, the gear mechanism being connected operatively with the means for changing the pitch angle of the rotor blades and with the throttle control means whereby adjustment of said gear mechanism to afford the low gear ratio is accompanied by an increase of the pitch angles of the rotor blades and also a reduction of throttle opening to prevent overrevving of the power unit.

23. In a helicopter, a sustaining rotor, means for changing the pitch angle of the blades of said rotor, means for driving the rotor including a power unit and variable gear mechanism affording low and high gear ratios, said means for driving the rotor also including a free-wheel device whereby the rotor may overrun the power unit upon adjustment of the gear mechanism to afford the low gear ratio, means affording an additional load with means for connecting said additional load means to the power unit, the gear mechanism being operatively connected with the means for changing the pitch of the rotor blades and with said additional load connecting means whereby upon adjustment of the gear mechanism to afford the low gear ratio the rotor blades are automatically adjusted to increased pitch angles and the additional load is connected automatically with the power unit to prevent overrevving of the latter.

24. In a helicopter, a sustaining rotor, means for changing the pitch angle of the blades of said rotor, means for driving the rotor including a power unit and variable gear mechanism affording low and high gear ratios, said means for driving the rotor also including a free-wheel device whereby the rotor may overrun the power unit upon adjustment of the gear mechanism to afford the low gear ratio, a variable pitch airscrew, means for varying the pitch of said airscrew, and means connecting the power unit to drive said airscrew, the gear mechanism being operatively interconnected with the means for changing the pitch angle of the blades of the rotor and with the means for varying the pitch of said airscrew, whereby adjustment of the gear mechanism to afford the low gear ratio is accompanied automatically by increase in pitch of the airscrew to prevent overrevving of the power unit.

25. In a helicopter, a sustaining rotor, means for changing the pitch angle of the blades of said rotor, means for driving the rotor including a power unit and variable gear mechanism affording low and high gear ratios, said means for drivng the rotor also including a free-wheel device whereby the rotor may overrun the power unit upon adjustment of the gear mechanism to afford the low gear ratio, actuating means for the means for changing the pitch angles of the rotor blades, gear ratio selecting means for the gear mechanism, a variable pitch airscrew, means for adjusting the pitch of said airscrew, means connecting the power unit to drive said airscrew, said gear ratio selecting means being connected operatively with said actuating means and with the means for varying the pitch of the airscrew, whereby when the low gear ratio is selected, increased pitch angles of the rotor blades are obtained together with increase in pitch of the airscrew, whereby overrevving of the power unit is prevented.

26. In a helicopter, a sustaining rotor, means for changing the pitch angle of the blades of said rotor, means for driving the rotor including a power unit and variable gear mechanism affording low and high gear ratios, said means for driving the rotor also including a free-wheel device whereby the rotor may overrun the power unit upon adjustment of the gear mechanism to afford the low gear ratio, actuating means for the means for changing the pitch angles of the rotor blades, gear ratio selecting means for the gear mechanism, a variable pitch airscrew, means for adjusting the pitch of said airscrew, and means connecting the power unit to drive said airscrew, said gear ratio selecting means being connected operatively with said actuating means and with the means for varying the pitch of the airscrew, whereby upon selection of the high gear ratio the pitch of said airscrew will be low and the pitch angles of the rotor blades will be low and when the low gear ratio is selected the pitch angle of the rotor blades will be high and the pitch of the airscrew will be high to prevent overrevving of the power unit upon selection of the low gear ratio and to ensure the transmission of maximum power from the power unit to the rotor when the high gear ratio is selected.

JAMES ALLAN JAMIESON BENNETT.